US006634520B2

(12) United States Patent
Coleman et al.

(10) Patent No.: US 6,634,520 B2
(45) Date of Patent: Oct. 21, 2003

(54) MECHANICALLY OPERATED PRODUCT DISPENSER INCLUDING A SLIDE CAM

(76) Inventors: Thomas J. Coleman, 19170 Paddock Pl., Abingdon, VA (US) 24211; William K. Schlotter, IV, 117 Wateredge La., Fredericksburg, VA (US) 22406; Princess Ann Coleman, 19170 Paddock Pl., Abingdon, VA (US) 24211; Ann M. Schlotter, 117 Wateredge La., Fredericksburg, VA (US) 22406

( * ) Notice: Subject to any disclaimer, the term of this patent is extended or adjusted under 35 U.S.C. 154(b) by 181 days.

(21) Appl. No.: 09/920,278

(22) Filed: Aug. 2, 2001

(65) Prior Publication Data

US 2003/0024941 A1 Feb. 6, 2003

(51) Int. Cl.[7] .............................................. B65G 65/48
(52) U.S. Cl. .......................................... 221/24; 221/263
(58) Field of Search .......................... 221/24, 265, 263

(56) References Cited

U.S. PATENT DOCUMENTS 721,971 A * 3/1903 Shafer et al. ............... 221/121
825,555 A * 7/1906 Pool ............................ 221/24
1,725,965 A * 8/1929 Ormiston ..................... 221/24
1,929,788 A * 10/1933 Myers et al. ............... 221/264
2,621,096 A * 12/1952 Broyles et al. ............... 221/68
2,855,124 A * 10/1958 Gensmer ..................... 221/24
3,593,882 A * 7/1971 Rhindress ............... 221/150 A
2003/0024939 A1 * 2/2003 Coleman et al. ............... 221/3

* cited by examiner

*Primary Examiner*—Donald P. Walsh
*Assistant Examiner*—Daniel K Schlak
(74) *Attorney, Agent, or Firm*—Melvin L. Crane Agent

(57) ABSTRACT

A mechanically operated product dispenser which has a push button that engages one end of a pivoted arm. The opposite end of the pivoted arm is pivotably connected to a slide gear that drives a drive gear. The drive gear drives a spindle on which a cam and a dispenser cog are secured. The cam has a sloping surface groove which receives an arm of a secondary housing in order to pivot the secondary housing as the cam is rotated. The dispenser cog is rotated by the spindle and forces a product in a product reservoir into a dispensing track in the secondary housing. Therefore, the device easily dispenses a product into a receptacle or into one's hand if desired.

10 Claims, 2 Drawing Sheets

MECHANICALLY OPERATED PRODUCT DISPENSER INCLUDING A SLIDE CAM

BACKGROUND OF THE INVENTION

This invention is directed to a product dispenser and more particularly it is directed to a product dispenser which is assumed to be amusing and enjoyable to children.

Heretofore different types of dispensers have been used for dispensing different products. Such dispensers may be hand-held or large stand-up types.

This dispenser is of the hand-held type which dispenses candy, gum, gum balls, etc. by operation of the dispenser.

OBJECTS AND ADVANTAGES

An object of the invention is to provide a dispenser which is easy to operate, has a pleasing appearance, and is amusing for children.

Another object is to provide a dispenser which is mechanically operated to dispense a product.

Yet another object is to provide a product dispenser which can be held in one's hand for dispensing a product.

Other objects and advantages of the invention will be obvious to those skilled in the art upon reading the specification and viewing the drawings.

DETAILED DESCRIPTION

Figure 1:
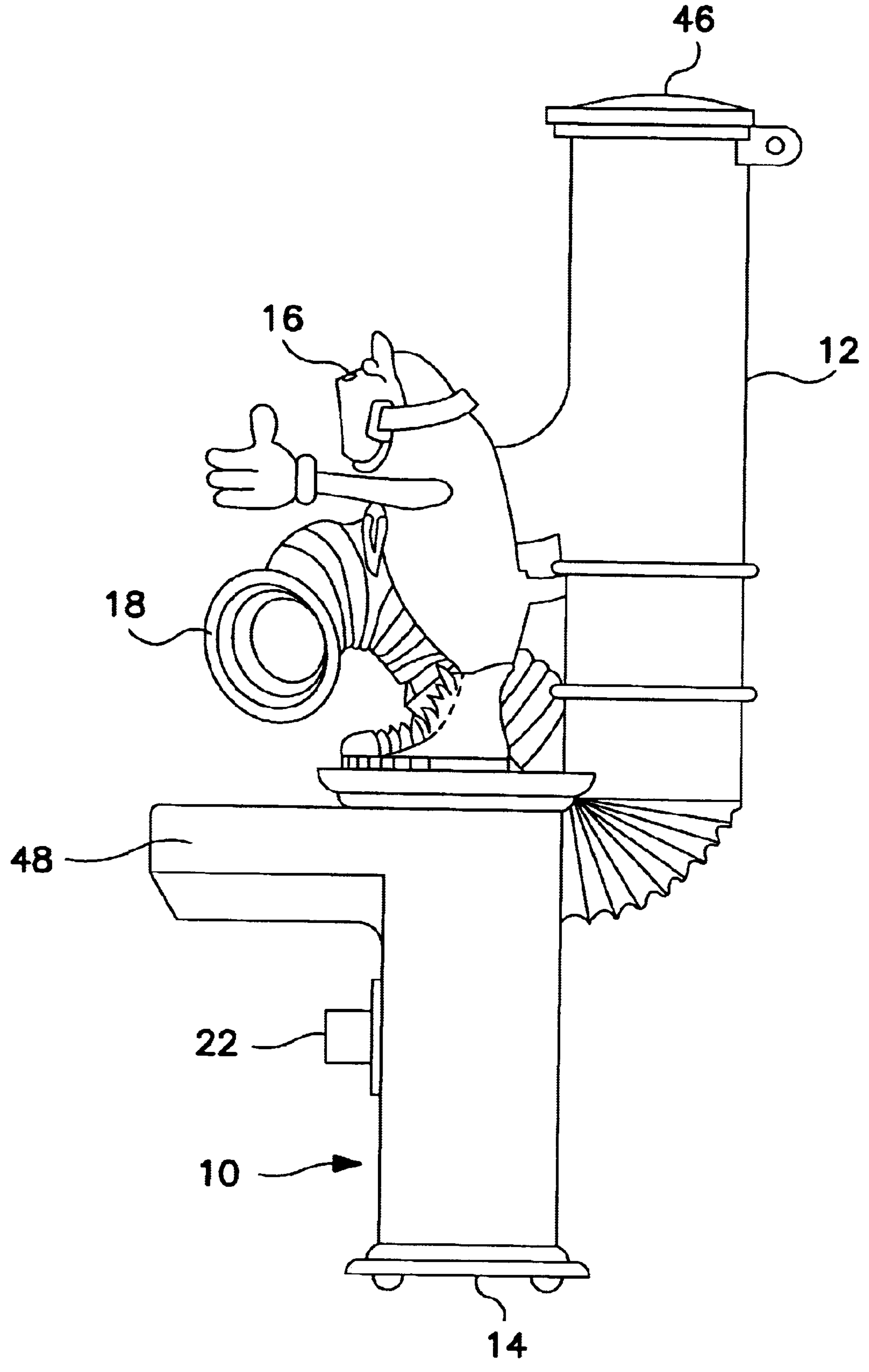
FIG. 1 is a side view of the dispenser illustrating the related parts.
Figure 2:
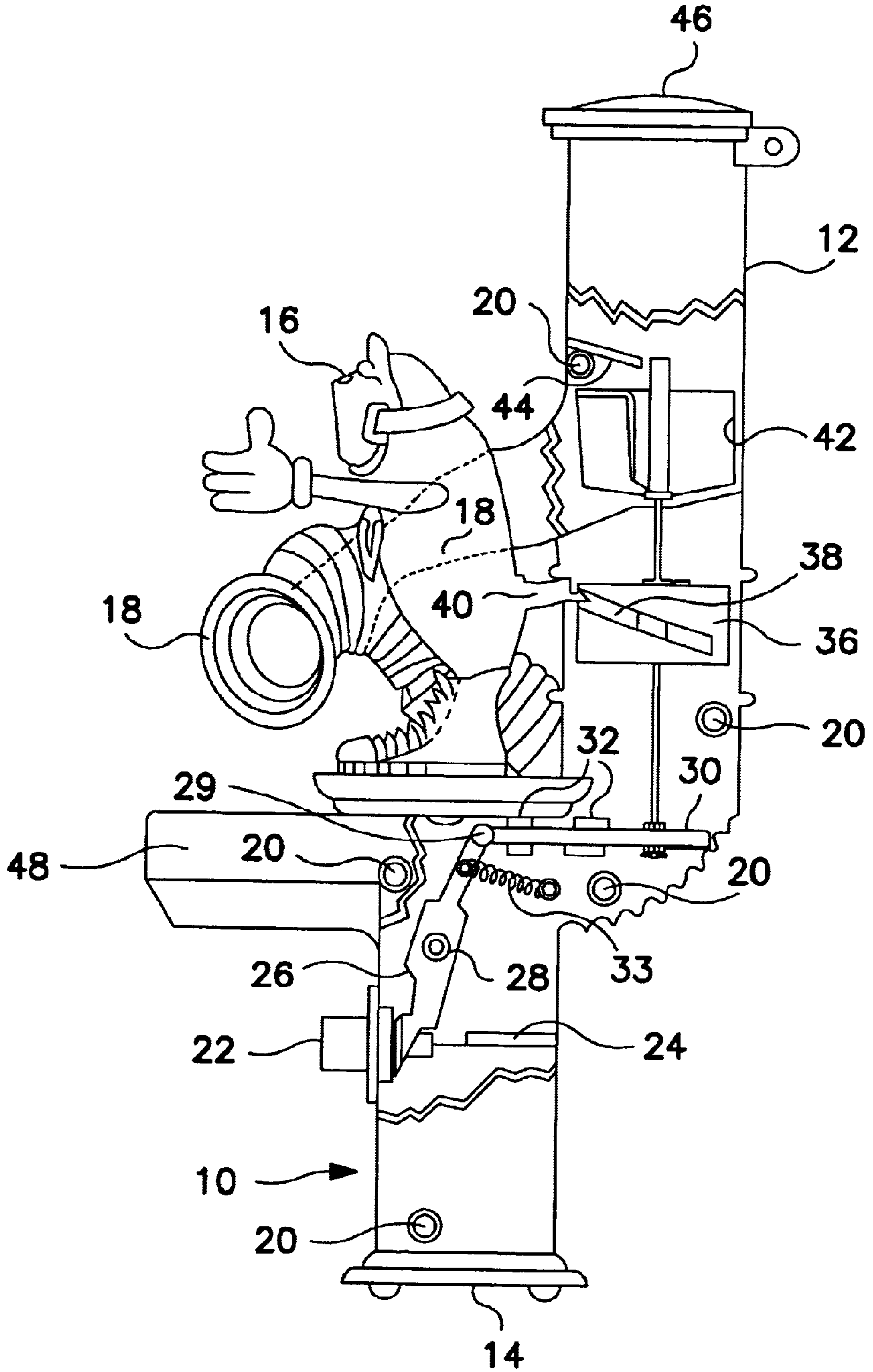
FIG. 2 is a side view with the housing cut away to illustrate the movable parts for dispensing a product.

Now referring to the drawings, there is shown a product dispenser which includes a main housing 10, a product receptacle 12, and a base 14 in which is contained the movable operative parts. A secondary housing 16 may be formed to resemble an animal or figure of some type which includes a product dispensing track 18. The housing may be formed with two half-compatible parts which are held together by rivets, small screws and threaded bolts or any other means. The securing parts are shown by securing parts 20. The device includes push button 22 which is held in place by a button slide 24. An inner end of the push button contacts one end of a depression arm 26 which is pivoted substantially at its midpoint on a pivot 28. The upper end of the depression arm is pivotably secured by a pivot 29 to one end of a straight geared arm 30 which slides in holders 32. A tension spring 33 has one end secured to the depression arm and one end secured to the main housing for forcing the geared arm 30 to a rest position when the push button is released. The geared arm drives a gear 34 to which one end of a spindle shaft 35 is secured to be driven by the geared arm. A cam block 36 is secured to the spindle shaft and rotates with the spindle shaft. The cam block has a sloping cam groove 38 in a surface of the cam block in which an end of a protruding arm 40 of the character forming the secondary housing slides, as the cam is rotated by the spindle shaft.

The secondary housing is secured to the main housing so that the secondary housing will pivot back and forth as the cam is rotated in opposite directions. The spindle shaft drives a dispensing cog 42 in the reservoir 12 which has a solid upper half surface and an open quadrant into which the product falls when the dispenser is in a rest position. An angular shelf 44 in the reservoir causes the product in the reservoir to slide toward the dispensing cog so that when the dispensing cog is in a rest position, the product will fall into the open quadrant. The reservoir is provided with a cover 46 that covers the upper end of the reservoir. Thus, the cover can be opened and some of the product can be added to the reservoir in order to provide a product to be dispensed. A product receptacle 48 can be added and secured to the main housing below the outlet opening of the dispensing track.

In operation, a product to be dispensed is added to the reservoir and the shelf 44 causes some of the product to fall into the open quadrant of the dispensing cog. Once the reservoir has been filled with a product, the dispenser is ready for use. The push button is pushed in so that the inner end of the button forces one end of the depression arm to pivot on the pivot point. As the depression arm pivots on the pivot point 28, the upper end of the depression arm moves the geared arm 30 to the left. As the geared arm is moved to the left, the drive gear 34, the spindle, the cam 36 and the dispensing cog are also rotated with the rotation of the spindle shaft. As the spindle shaft rotates, the arm 40 that fits into the cam groove causes the secondary housing to pivot toward the main housing. Also the dispensing cog will be rotated to force the product from the filled quadrant into the product dispensing track in the secondary housing.

When the push button is released by the user, the tension spring 33 forces the upper end of the depression arm toward an axis of the main housing which causes the geared arm to move to the right which in turn causes the drive gear 34 to rotate in an opposite direction. As the drive gear rotates, the cam and dispensing cog will also rotate in a reverse direction. Therefore, the secondary housing will be pivoted to the left and the dispensing cog will rotate to the right so that the open quadrant of the dispensing cog will be loaded with candy again for future dispensing of the product.

In making the dispenser, the housing should be made without any sharp edges or points so that a user will not injure themselves.

The foregoing relates to preferred exemplary embodiments of the invention, it being understood that other variants and embodiments thereof are possible within the spirit and scope of the invention, the latter being defined by the appended claims.

We claim:

1. A product dispenser having a main housing with a secondary housing pivotably secured to the main housing, a reservoir (12) for a product and a dispensing track (18) in said secondary housing for dispensing the product, a push button (22) secured to the main housing, a depression arm (26) in said secondary housing that pivots about a pivot point (28), a slide gear pivotably connected at one end to an end of said depression arm (26), a drive gear (34) which is driven by compatible gear teeth on the slide gear, a cam slide (38) and a dispensing cog (42), each of which is rotatable by a spindle shaft driven by said drive gear, a product dispensing track in said secondary housing, said product dispensing track includes an inlet that aligns with an outlet of the reservoir and the product dispensing track has an outlet through which the product will fall for consumption by a person.

2. A product dispenser as set forth in claim 1, in which said cam during rotation in one direction pivots said secondary housing which moves the secondary housing toward said product reservoir and upon rotation of said cam in an opposite direction, said secondary housing is moved away from the product reservoir which aids in dispensing the product.

3. A product dispenser as set forth in claim 2, which includes a receptacle in which dispensed products may be loaded.

4. A product dispenser as set forth in claim 2, in which said secondary housing is in a form of a person, character, or animal.

5. A product dispenser as set forth in claim 2, in which the main housing includes a base upon which the dispenser may be seated onto a smooth surface.

6. A product dispenser as set forth in claim 1, which includes a receptacle in which dispensed products may be loaded.

7. A product dispenser as set forth in claim 1, in which the main housing includes a base upon which the dispenser may be seated onto a smooth surface.

8. A product dispenser as set forth in claim 7, which includes a receptacle in which dispensed products may be loaded.

9. A product dispenser as set forth in claim 1, in which said secondary housing is in a form of a person, character, or animal.

10. A product dispenser as set forth in claim 9, which includes a receptacle in which dispensed products may be loaded.

* * * * *